US007467543B2

(12) United States Patent
Schoor et al.

(10) Patent No.: US 7,467,543 B2
(45) Date of Patent: Dec. 23, 2008

(54) METHOD FOR DIAGNOSIS IN A FUEL INJECTION DEVICE COMPRISING A PIEZOACTUATOR

(75) Inventors: Ulrich Schoor, Stuttgart (DE); Kai Sutter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 437 days.

(21) Appl. No.: 10/556,599

(22) PCT Filed: Aug. 7, 2004

(86) PCT No.: PCT/DE2004/001780

§ 371 (c)(1),
(2), (4) Date: Nov. 14, 2005

(87) PCT Pub. No.: WO2005/045234

PCT Pub. Date: May 19, 2005

(65) Prior Publication Data

US 2007/0001545 A1 Jan. 4, 2007

(30) Foreign Application Priority Data

Oct. 24, 2003 (DE) ................................ 103 49 824

(51) Int. Cl.
*G01M 15/00* (2006.01)

(52) U.S. Cl. .................................................... 73/114.45

(58) Field of Classification Search .............. 73/114.38, 73/114.45, 114.46, 114.47, 114.48, 114.49, 73/114.51
See application file for complete search history.

(56) References Cited

U.S. PATENT DOCUMENTS

| | | | | |
|---|---|---|---|---|
| 6,472,796 | B1 | 10/2002 | Hoffmann et al. | |
| 6,478,013 | B1 * | 11/2002 | Boecking .................... | 123/467 |
| 6,705,291 | B2 * | 3/2004 | Rueger et al. ............... | 123/467 |
| 2001/0039484 | A1 | 11/2001 | Freudenberg et al. | |
| 2002/0000218 | A1 | 1/2002 | Rueger et al. | |
| 2002/0023622 | A1 | 2/2002 | Rueger et al. | |

FOREIGN PATENT DOCUMENTS

| | | | |
|---|---|---|---|
| DE | 198 45 042 | A1 | 4/2000 |
| EP | 1 138 907 | A1 | 10/2001 |
| EP | 1 139 448 | A1 | 10/2001 |
| EP | 1 167 729 | A1 | 1/2002 |
| JP | 2002-134804 | | 5/2002 |
| JP | 2003-219664 | | 7/2003 |
| WO | WO 99/67527 | A2 | 12/1999 |
| WO | WO 2004/051066 | A1 | 6/2004 |

* cited by examiner

*Primary Examiner*—Eric S McCall
(74) *Attorney, Agent, or Firm*—Ronald E. Greigg

(57) ABSTRACT

A method for diagnosing a fuel injection device which includes a piezoelectric actuator, with which a valve element is actuated. The fuel injection device is connected to a diagnostic device which applies a defined voltage to the piezoelectric actuator. The charge introduced into the piezoelectric actuator, and from that a capacitance of the piezoelectric actuator, are ascertained by means of the diagnostic device.

19 Claims, 3 Drawing Sheets

METHOD FOR DIAGNOSIS IN A FUEL INJECTION DEVICE COMPRISING A PIEZOACTUATOR

CROSS-REFERENCE TO RELATED APPLICATIONS

This application is a 35 USC 371 application of PCT/DE 2004/001780filed on Aug. 7, 2004.

BACKGROUND OF THE INVENTION

1. Field of the Invention

The invention pertains first to a method for diagnosing a fuel injection device which has a piezoelectric actuator for actuating a valve element.

2. Description of the Prior Art

Particularly in internal combustion engines with direct fuel injection, fuel injection devices are used whose valve elements are actuated not electromagnetically but rather, at least indirectly, by the change in length of a piezoelectric actuator. The advantage of piezoelectric actuators is their very fast switching time and the very precise stroke adjustment that is possible. By using such fuel injection devices, the fuel can be introduced very precisely into the engine combustion chambers, which in turn leads to favorable emissions and low fuel consumption.

For the function of the engine, the correct function of the piezoelectric actuator therefore plays a central role, which in turn necessitates monitoring the correct function of the piezoelectric actuator. It is for instance known to determine the capacitance of the piezoelectric actuators used again and again during engine operation. If a major change in capacitance is found within a defined period of time, this is an indication of damage to the piezoelectric actuator, for instance. In that case, the fuel can no longer be introduced with the required precision into the combustion chamber of the engine by the corresponding fuel injection device.

If a fuel injection device is blocked in the opened position, this is also detected. In such a case, a compulsory shutdown of the engine may even be necessary. If a malfunction is detected, a fault entry is made in a fault memory. The stored fault data can be read out in a repair facility by a suitable diagnostic device. In this way, the mechanic learns the location and type of the fault that has occurred.

It is, therefore the object of the present invention to refine a method of the type defined at the outset such that the diagnosis of the fuel injection device can also be done “in the field”, that is, far away from a repair facility or a suitably equipped repair vehicle.

SUMMARY AND ADVANTAGES OF THE INVENTION

The above object is attained in accordance with the invention in that the fuel injection device is connected directly to a diagnostic device by means of which a defined voltage is applied to the piezoelectric actuator and the charge introduced into the piezoelectric actuator, and from that a capacitance of the piezoelectric actuator, are ascertained.

In the method of the invention, there is no need to access a fault memory. Instead, with the engine stopped, the fuel injection device is connected directly to a suitable diagnostic device, which attempts to introduce a defined, predetermined charge quantity into the piezoelectric actuator. From the charge quantity actually introduced, the actual capacitance of the piezoelectric actuator can then be ascertained in a simple way. This is a measure of the instantaneous functional status of the piezoelectric actuator. The charge is ascertained for instance on the basis of the current that has actually flowed.

With knowledge of the capacitance of the piezoelectric actuator at present, it is also easy to find whether the piezoelectric actuator can be the cause of a problem that has occurred, or not. The piezoelectric actuator need not be removed from the engine for checking its status, which shortens the time needed for performing the diagnosis.

Since as noted no data exchange takes place, but instead only present characteristic electrical values of the piezoelectric actuator are checked, the diagnostic device can be very simple and small, so that it can be used everywhere, even outside a repair facility or without calling a repair car. It is optionally conceivable to integrate such a diagnostic device into the on-board electrical system that exists anyway in a motor vehicle. Moreover, with such a method, an on-receipt inspection can also be performed before a fuel injection device is installed in an internal combustion engine.

First, it is proposed that the diagnostic device ascertains a course of the capacitance. The course of the capacitance, given a known course of the applied voltage and of the applied current, is even more conclusive of the functional status of the piezoelectric actuator than a single absolute value for the capacitance. In this way, the capability of the piezoelectric actuator to function can be ascertained even better.

It is also advantageous if the diagnostic device compares the ascertained capacitance, or the ascertained course of the capacitance, with at least one reference capacitance, or a reference course, and generates a signal as a function of the outcome of the comparison. In this refinement, the user is relieved of the task of interpreting the results. By means of the comparison, the diagnostic device makes the outcome of diagnosis immediately available.

In a refinement of this, it is proposed that on the basis of the signal, a display with at least two colors is triggered, by which it is indicated whether the ascertained capacitance, or the course, is within a tolerance range around the reference capacitance or the reference course. In the simplest case, when two colors are used, the diagnostic device provides a readily apparent visual indication as to whether the piezoelectric actuator, or the fuel injection device, being examined is in proper order, or whether there is a fault. This makes it easier to perform the method of the invention and speeds up the diagnosis.

It is especially advantageous if the applied voltage during the diagnosis corresponds at least approximately to a voltage such as occurs in normal operation of the fuel injection device. A typical example of this is that the diagnostic device applies a voltage that has one linearly rising portion, one constant portion, and one linearly dropping portion to the piezoelectric actuator. In that case, the diagnostic device, despite the fact that the engine is stopped, simulates an actual operating situation. The outcome of diagnosis is especially conclusive in this case.

The invention also relates to a device for performing the aforementioned diagnostic method. So that this device can be as small as possible and produced as inexpensively as possible, it is proposed that it has a capacitor charging circuit, which furnishes the energy required for triggering the piezoelectric actuator.

For triggering piezoelectric actuators, high voltages and comparatively high currents are necessary. Since a status diagnosis of the piezoelectric actuator does not require a continuously repeated triggering of the piezoelectric actuator, and instead a single triggering within a defined period of time suffices, a capacitor charging circuit offers a simple, spacesaving, inexpensive possibility of furnishing the energy required for triggering the piezoelectric actuator. The energy for charging the capacitor of the capacitor charging circuit can be furnished, in the case of a motor vehicle, by the 12 V car battery, a 230 V line connection, or a photovoltaic system, for instance.

It is also especially advantageous if it forms a self-contained structural unit. This means that the energy supply, the signal processing, the visual display or audible indication, and an evaluation circuit are disposed inside a compact housing. This makes performing the method still easier.

It is also especially advantageous if it forms a self-contained structural unit. This means that the energy supply, the signal processing, the visual display or audible indication, and an evaluation circuit are disposed inside a compact housing. This makes performing the method still easier.

Using the device of the invention is made easier because it includes a connection device which is complementary to a connection device on the fuel injection device or on the engine. To use the device of the invention, it then for instance suffices to pull out a plug located in the vehicle from the fuel injection device, and instead to connect a plug of the diagnostic device of the invention to the fuel injection device.

It is also proposed that it has an interface for the connection of a PC. As a result, if necessary, further automated tests, which are programmed on the PC, can be made by means of the device of the invention. The evaluation of the outcome of diagnosis can also be done in a more differentiated way in this manner. A notebook or tablet PC is advantageously used as the PC.

BRIEF DESCRIPTION OF THE DRAWINGS

An especially preferred exemplary embodiment of the present invention is described in detail below, in conjunction with the accompanying drawings. Shown in the drawings are.

DESCRIPTION OF THE PREFERRED EMBODIMENT

Figure 1:
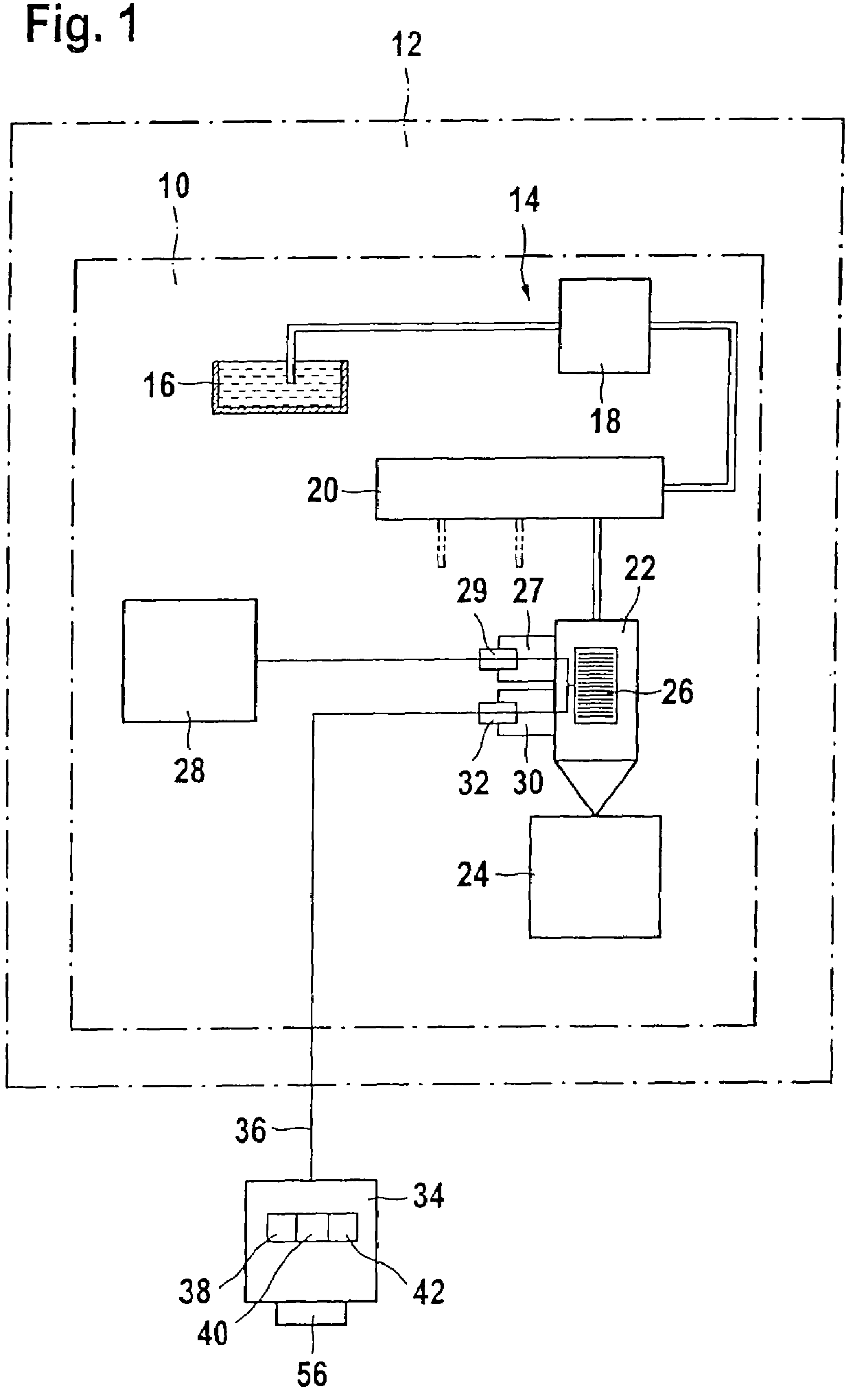
FIG. 1, a schematic illustration of an internal combustion engine, with a fuel injection device with a piezoelectric actuator, and of a diagnostic device.

In FIG. 1, an internal combustion engine is identified overall by reference numeral 10. It serves to drive a motor vehicle, which in FIG. 1, like the engine 10, is represented only by a dot-dashed line and which is identified by reference numeral 12. The engine 10 includes a fuel system 14. The fuel system includes a fuel tank 16, from which a pumping device 18 pumps the fuel to a fuel collection line 20. The fuel collection line is also known as “rail”, and in it, the fuel is stored at high pressure.

A plurality of fuel injection devices 22 are connected to the fuel collection line 20 and each injects fuel directly into an assigned combustion chamber 24. For the sake of simplicity, only one fuel injection device 22 and one combustion chamber 24 are shown. The fuel injection device 22 includes a valve element, not visible in the drawing, which depending on its position uncovers fuel outlet openings (not shown), through which the fuel from the fuel injection device 22 can reach the combustion chamber 24. The position of the valve element is varied by the present length of a piezoelectric actuator 26. This length varies as a function of the charge introduced into the piezoelectric actuator. To that end, the piezoelectric actuator 26 is connected, via an electrical receptacle, or socket 27 attached to the fuel injection device 22 and via a plug 29 to a control and regulating unit 28.

For the operation of the internal combustion engine 10, a correct function of the piezoelectric actuator 26 is of central significance. Only when the piezoelectric actuator 26 is operating correctly is the desired quantity of fuel injected into the combustion chamber 24 by the fuel injection device 22. The emissions and fuel consumption of the engine 10 therefore also depend on the correct function of the piezoelectric actuator 26.

The function of the piezoelectric actuator 26 is monitored again and again during the operation of the engine 10 by the control and regulating unit 28. In the event of a fault, an entry is made in a fault memory of the control and regulating unit 28, and/or the engine 10 is switched to an emergency operating mode or even shut down completely. The entries in the fault memory can be read out, for instance in a repair facility or by a mobile service vehicle by means of a diagnostic device, which is connected to the control and regulating unit 28. However, a diagnostic device of this kind is large and heavy and therefore hard to carry. Moreover, because of the complicated electronics, it is comparatively expensive.

To enable performing a status diagnosis of the fuel injection device 22 and in particular of the piezoelectric actuator 26 even underway, far from a repair facility or a service vehicle, the fuel injection device 22 has a socket 30, connected directly to the piezoelectric actuator 26, into which a plug 32 of a small, portable diagnostic device 34 can be plugged. The plug 32 is connected to the diagnostic device 34 via a cord 36. In an exemplary embodiment not shown, the separate socket 30 is dispensed with. Instead, the plug 29, with which the control and regulating unit 28 is connected to the socket 27, is pulled out of that socket, and the plug 32 of the diagnostic device 34 is instead plugged into the socket 27.

Figure 2:
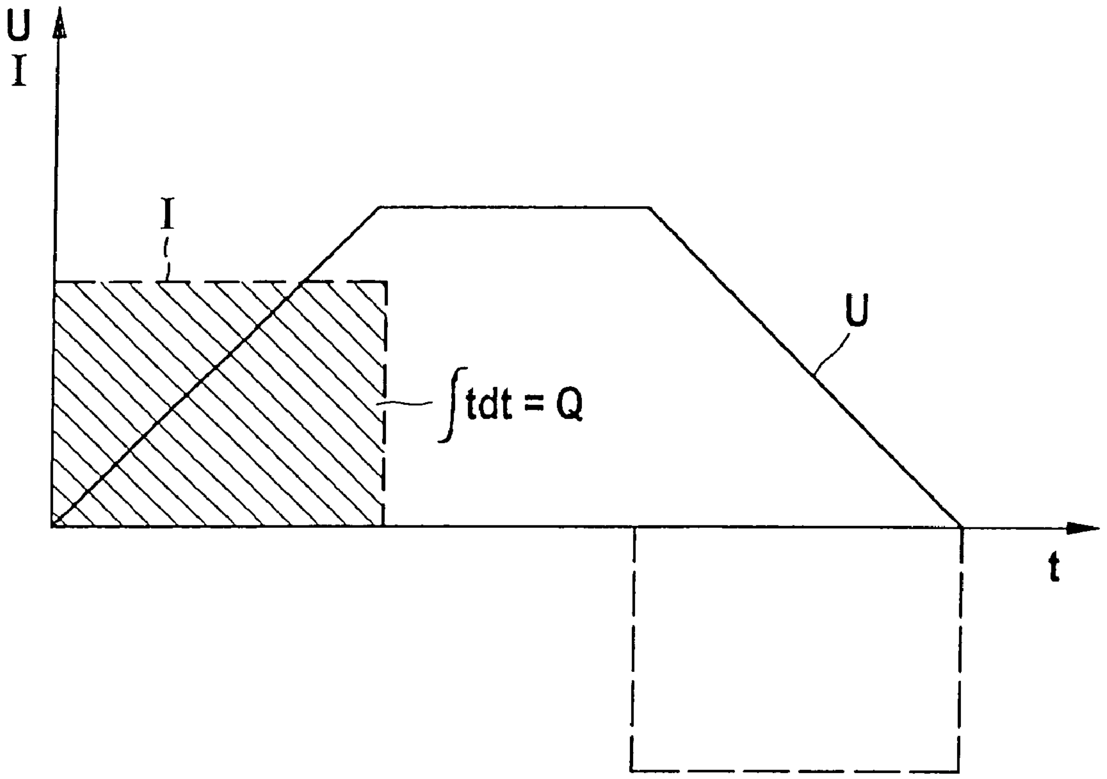
FIG. 2, a graph in which a voltage and a current that are applied to the piezoelectric actuator of FIG. 1 are plotted over time.

For diagnosing the piezoelectric actuator 26, a current I is applied to the piezoelectric actuator 26 by the diagnostic device 34, and the voltage U resulting at the capacitor is ascertained. The corresponding curve is shown in FIG. 2. It can be seen that the voltage U applied to the piezoelectric actuator 26 initially, in the normal situation, has a linearly rising portion, then a portion of constant voltage, and finally a linearly dropping portion. This is approximately equivalent to the ramplike triggering of the piezoelectric actuator 26 during normal operation of the engine 10. The maximum voltage level attained and the steepness of the edges also correspond at least approximately to a typical triggering of the piezoelectric actuator 26 during an injection event.

During the rise in the voltage U, a constant current I flows (dashed line in FIG. 2). The rising voltage U causes a change in length of the piezoelectric actuator 26, which in operation of the engine 10 would lead to an injection of fuel. To keep the diagnosis from damaging the engine 10, the diagnosis is performed only with the engine 10 shut off. In the diagnostic device 34, the integral of the current I that has flowed is calculated over time t. This integral is equivalent to the charge Q that has been introduced into the piezoelectric actuator 26. If the charge Q is divided by the voltage U, the result is the capacitance C of the piezoelectric actuator 26.

The capacitance C of the piezoelectric actuator 26 is an important parameter for the functional status of the piezoelectric actuator 26. For instance, if the piezoelectric actuator 26 breaks, the result is a pronounced change in the capacitance C. This can be recognized by using the diagnostic device 34. In the simplest case, the ascertained capacitance C is output as a numerical value by the diagnostic device 34. From the numerical value, the user can then assess on his own whether the piezoelectric actuator 26 is working properly or not. However, it is also possible for the diagnostic device, in a suitable evaluation circuit, automatically to compare the detected capacitance with an upper and a lower limit value.

If the capacitance C ascertained is in the range between the two limit values, a green light 38 lights up on the diagnostic device 34. This is a signal that the piezoelectric actuator 26 is functioning properly. If the ascertained capacitance C is quite close to one of the limit values, then a yellow light 40 on the diagnostic device 34 lights up, which signals that the piezoelectric actuator 26, while not appearing completely defective, is nevertheless no longer fully performing to specifications. Conversely, if the capacitance C is clearly outside the range defined by the two limit values, then a red light 42 on the diagnostic device 34 lights up, which indicates to the user that the piezoelectric actuator 26 is defective.

Figure 3:
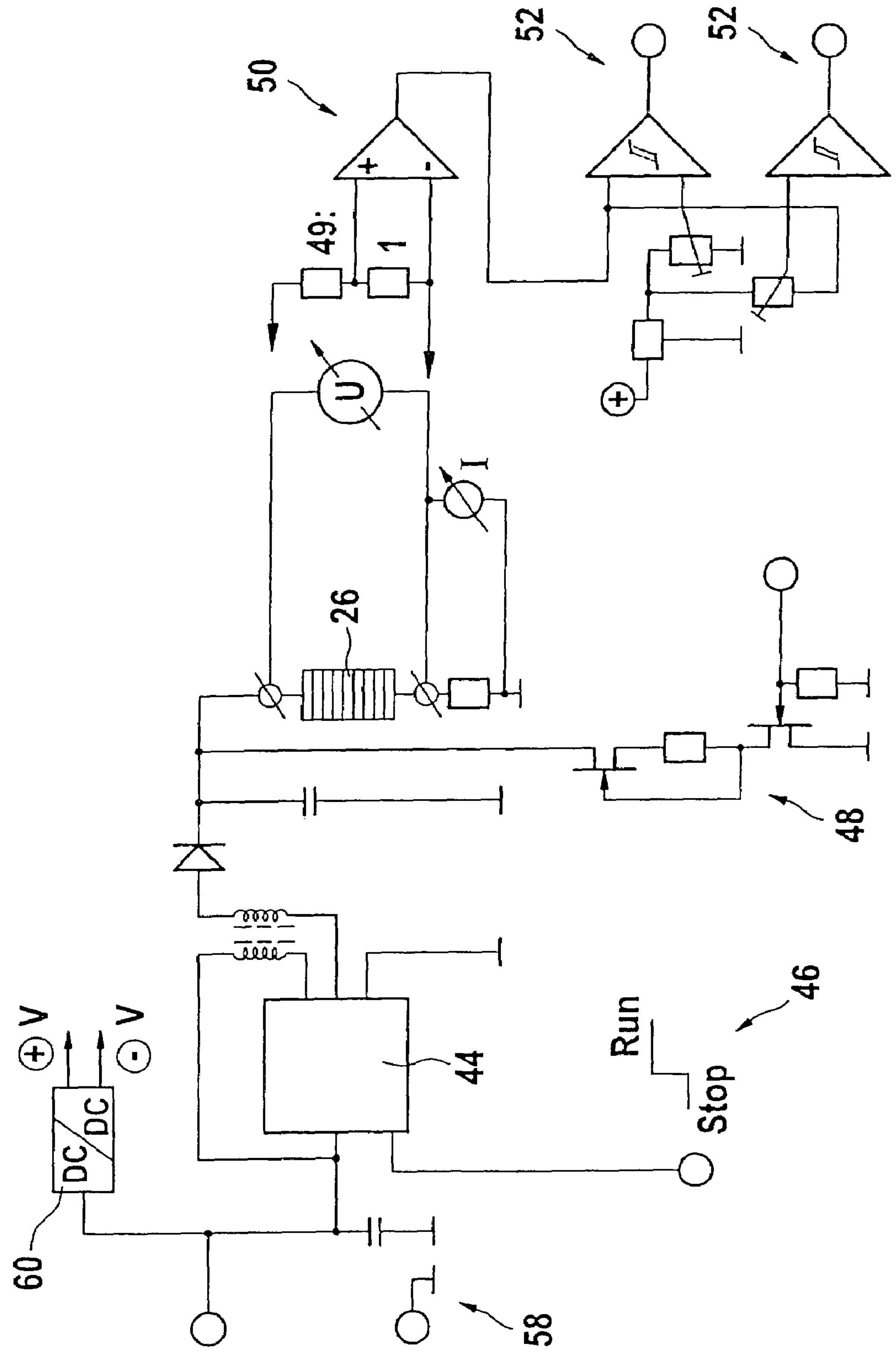
FIG. 3, a simplified, schematic electrical circuit diagram of the diagnostic device of FIG. 1.

As FIG. 3 shows, the diagnostic device 34 is very simple in construction, since for furnishing the feed voltage and the current supply that are applied to or flow in the piezoelectric actuator 26 for the diagnosis, a commercially available capacitor charging circuit 44 is used. It is for instance possible to use a capacitor charging circuit of the LT3420type (Linear Technology Magazine, May 2002), which is typically used for furnishing the tripping energy for xenon flash units of cameras and has a capacitor with a capacitance of 220μF, which within 3.5 seconds with 5 V input voltage can be charged from 50 V to 320 V.

Since unlike a flash unit of a camera, however, in the present diagnostic device 34 the piezoelectric actuator is not only charged but must also be discharged again, the electrical circuit of the diagnostic device 34 shown in FIG. 3 has not only a triggered charging signal 46 but also a discharging circuit 48 for constant current. The control of the charging and discharging operation is done via an operational amplifier 50 as well as two Schmitt triggers 54. To enable controlling the course of the diagnosis in the diagnostic device 34, a microprocessor with an A/D converter is integrated with the diagnostic device. For connection to a PC, particularly a notebook, the diagnostic device 34 also has a suitable interface 56 (see FIG. 1).

The circuit shown in FIG. 3 is supplied with current via the terminals 58. A built-in rechargeable battery, batteries, a connection to an on-board electrical system of the motor vehicle 12, a connection to a 230 V line voltage, or a supply via a photovoltaic converter is also possible here. A DC/DC converter 60 connected to the terminals 58 furnishes the energy for amplification circuits, for instance for the displays 38 through 42.

In the exemplary embodiment described in conjunction with FIGS. 1 through 3, a diagnostic device 34 has been shown which intrinsically serves to diagnose a fuel injection device 22 installed in a motor vehicle 12. In principle, however, the proposed method and the proposed diagnostic device 34 can also be used by the motor vehicle manufacturer for on-receipt inspection of the fuel injection devices 22 shipped even before they are installed in the internal combustion engine 10 or motor vehicle 12. This makes it possible to avoid installing defective fuel injection devices 22 in an internal combustion engine 10 or a motor vehicle 12.

The diagnostic device 34 is very compact and can therefore be a component of an on-board electrical system of the motor vehicle 12. In a common housing, it includes the power supply, all the converters, an evaluation circuit, a control processor and a display processor, and the displays 38 through 42, or alternatively or in addition an LCD display, along with the connection cord 36 and the plug 32.

The foregoing relates to preferred exemplary embodiments of the invention, it being understood that other variants and embodiments thereof are possible within the spirit and scope of the invention, the latter being defined by the appended claims.

The invention claimed is:

1. A diagnostic device for the diagnosis of a fuel injection device having a piezoelectric actuator, the diagnostic device performing the step of ascertaining a charge introduced into the piezoelectric actuator and from that a capacitance of the piezoelectric actuator, wherein the diagnostic device is transportable and separate from a control and regulating unit of the fuel injection device, and wherein the diagnostic device forms a self-contained structural unit and comprises a visual display or an audible indication for displaying the functional status of the piezoelectric actuator.

2. The device in accordance with claim 1, wherein the device comprises a capacitor charging circuit, which furnishes the energy required for triggering the piezoelectric actuator.

3. The device in accordance with claim 2, wherein the capacitor charging circuit is a commercially available circuit of the kind used for flash units.

4. The device in accordance with claim 2, further comprising a connection device which is complementary to a connection device on the fuel injection device.

5. The device in accordance with claim 2, further comprising an interface for the connection of a PC.

6. A method for using a diagnostic device according to claim 1, comprising the steps of connecting the fuel injection device directly to the diagnostic device, applying a defined voltage to the piezoelectric actuator by means of the diagnostic device, ascertaining the charge introduced into the piezoelectric actuator, and from that ascertaining a capacitance of the piezoelectric actuator by means of the diagnostic device.

7. The method in accordance with claim 6, wherein the applied voltage during diagnosis corresponds at least approximately to a voltage such as occurs in normal operation of the fuel injection device.

8. The method in accordance with claim 6, further comprising employing diagnostic device to ascertain a course of the capacitance.

9. The method in accordance with claim 8, wherein the applied voltage during the diagnosis corresponds at least approximately to a voltage such as occurs in normal operation of the fuel injection device.

10. A method for diagnosis of a fuel injection device having a piezoelectric actuator for actuating a valve element, the method comprising the steps of:

connecting the fuel injection device directly to a diagnostic device;

applying a defined voltage to the piezoelectric actuator by means of the diagnostic device;

ascertaining the charge (Q) introduced into the piezoelectric actuator and from that a capacitance of the piezoelectric actuator by means of the diagnostic device, and employing the diagnostic device to compare the ascertained capacitance, or an ascertained course of the capacitance, with at least one reference capacitance, or a reference course, and generating a signal as a function of the outcome of the comparison.

11. The method in accordance with claim 10, wherein the applied voltage during the diagnosis corresponds at least approximately to a voltage such as occurs in normal operation of the fuel injection device.

12. A device for performing a diagnostic method in accordance with claim 10, wherein the device comprises a capacitor charging circuit, which furnishes the energy required for triggering the piezoelectric actuator.

13. The method in accordance with claim 10, further comprising triggering a visual display with at least two colors triggered on the basis of the generated signal, and employing the visual display to indicate whether the ascertained capacitance, or the course, is within a tolerance range around the reference capacitance or the reference course.

14. The method in accordance with claim 13, wherein the applied voltage during the diagnosis corresponds at least approximately to a voltage such as occurs in normal operation of the fuel injection device.

15. A device for performing a diagnostic method in accordance with claim 13, wherein the device comprises a capacitor charging circuit, which furnishes the energy required for triggering the piezoelectric actuator.

16. The device in accordance with claim 15, wherein the capacitor charging circuit is a commercially available circuit of the kind used for flash units.

17. A method for diagnosis of a fuel injection device having a piezoelectric actuator for actuating a valve element, the method comprising the steps of:

connecting the fuel injection device directly to a diagnostic device;

applying a defined voltage to the piezoelectric actuator by means of the diagnostic device;

ascertaining the charge (Q) introduced into the piezoelectric actuator and from that a capacitance of the piezoelectric actuator by means of the diagnostic device;

employing the diagnostic device to ascertain a course of the capacitance; and employing the diagnostic device to compare the ascertained capacitance, or the ascertained course of the capacitance, with at least one reference capacitance, or a reference course, and generating a signal as a function of the outcome of the comparison.

18. The method in accordance with claim 17, further comprising triggering a visual display with at least two colors triggered on the basis of the generated signal, and employing the visual display to indicate whether the ascertained capacitance, or the course, is within a tolerance range around the reference capacitance or the reference course.

19. The method in accordance with claim 18, wherein the applied voltage during the diagnosis corresponds at least approximately to a voltage such as occurs in normal operation of the fuel injection device.

* * * * *